United States Patent
Lagares Gamero

(10) Patent No.: US 10,477,870 B2
(45) Date of Patent: Nov. 19, 2019

(54) PLANT AND METHOD FOR THE TREATMENT OF WHOLE MUSCLE MEAT

(71) Applicant: METALQUIMIA, S.A.U., Girona (ES)

(72) Inventor: Josep Lagares Gamero, Girona (ES)

( * ) Notice: Subject to any disclaimer, the term of this patent is extended or adjusted under 35 U.S.C. 154(b) by 0 days.

(21) Appl. No.: 16/098,889

(22) PCT Filed: Apr. 19, 2017

(86) PCT No.: PCT/IB2017/052231
§ 371 (c)(1),
(2) Date: Nov. 5, 2018

(87) PCT Pub. No.: WO2017/191519
PCT Pub. Date: Nov. 9, 2017

(65) Prior Publication Data
US 2019/0191726 A1   Jun. 27, 2019

(30) Foreign Application Priority Data

May 5, 2016 (EP) .................................. 16382196

(51) Int. Cl.
*A22C 9/00* (2006.01)
*A22B 7/00* (2006.01)
*A22C 18/00* (2006.01)

(52) U.S. Cl.
CPC .............. *A22C 9/001* (2013.01); *A22B 7/001* (2013.01); *A22C 9/005* (2013.01); *A22C 18/00* (2013.01)

(58) Field of Classification Search
CPC .. A22C 9/00; A22C 7/00; A22C 7/001; A22C 7/002

USPC .................................................. 452/141–147
See application file for complete search history.

(56) References Cited

U.S. PATENT DOCUMENTS

| | | | | |
|---|---|---|---|---|
| 4,074,389 A * | 2/1978 | Blair | ..................... | A22C 9/001 452/174 |
| 4,186,462 A * | 2/1980 | Bettcher | ................ | A22C 9/001 452/141 |
| 4,411,047 A * | 10/1983 | Norton | ..................... | A23B 4/28 426/281 |
| 4,791,705 A * | 12/1988 | Corominas | ............ | A22C 9/005 100/910 |
| 5,609,520 A * | 3/1997 | Stewart | ................ | A22B 5/0035 452/131 |
| 7,011,575 B2 * | 3/2006 | Smarsh | .................... | A22C 9/00 452/141 |

(Continued)

*Primary Examiner* — Richard T Price, Jr.
(74) *Attorney, Agent, or Firm* — Eugenio J. Torres-Oyola; Victor M. Rodriguez-Reyes; Ferraiuoli LLC

(57) ABSTRACT

The invention relates to a plant and method for the treatment of whole muscle meat, wherein the proposed plant includes a brine injection apparatus (1) with a conveyor device (10); three successive injector heads (20), each provided with a plurality of injector needles (21) connected to pressurized brine supply devices (30); one of said injector heads being connected to a first pressurized brine supply device (31), being independent from the remaining injector heads (20); and said plant also including at least one massage application apparatus (2) including a rotary drum (40) of between 140 cm and 210 cm for loading the whole muscle meat after injection thereof, operated at between 14 and 20 revolutions per minute, obtaining an increase in weight of the whole muscle meat greater than 220%.

14 Claims, 1 Drawing Sheet

(56) References Cited

U.S. PATENT DOCUMENTS

| | | | | |
|---|---|---|---|---|
| 7,300,343 B2* | 11/2007 | Voigt | ............... | A22C 9/001 |
| | | | | 452/171 |
| 7,527,550 B1* | 5/2009 | Leech | ............... | A22C 17/08 |
| | | | | 452/173 |
| 7,621,805 B2* | 11/2009 | Bolzacchini | ......... | A22C 9/008 |
| | | | | 452/141 |
| 8,047,902 B2* | 11/2011 | Van Esbroeck | ....... | A22C 9/005 |
| | | | | 452/141 |

* cited by examiner

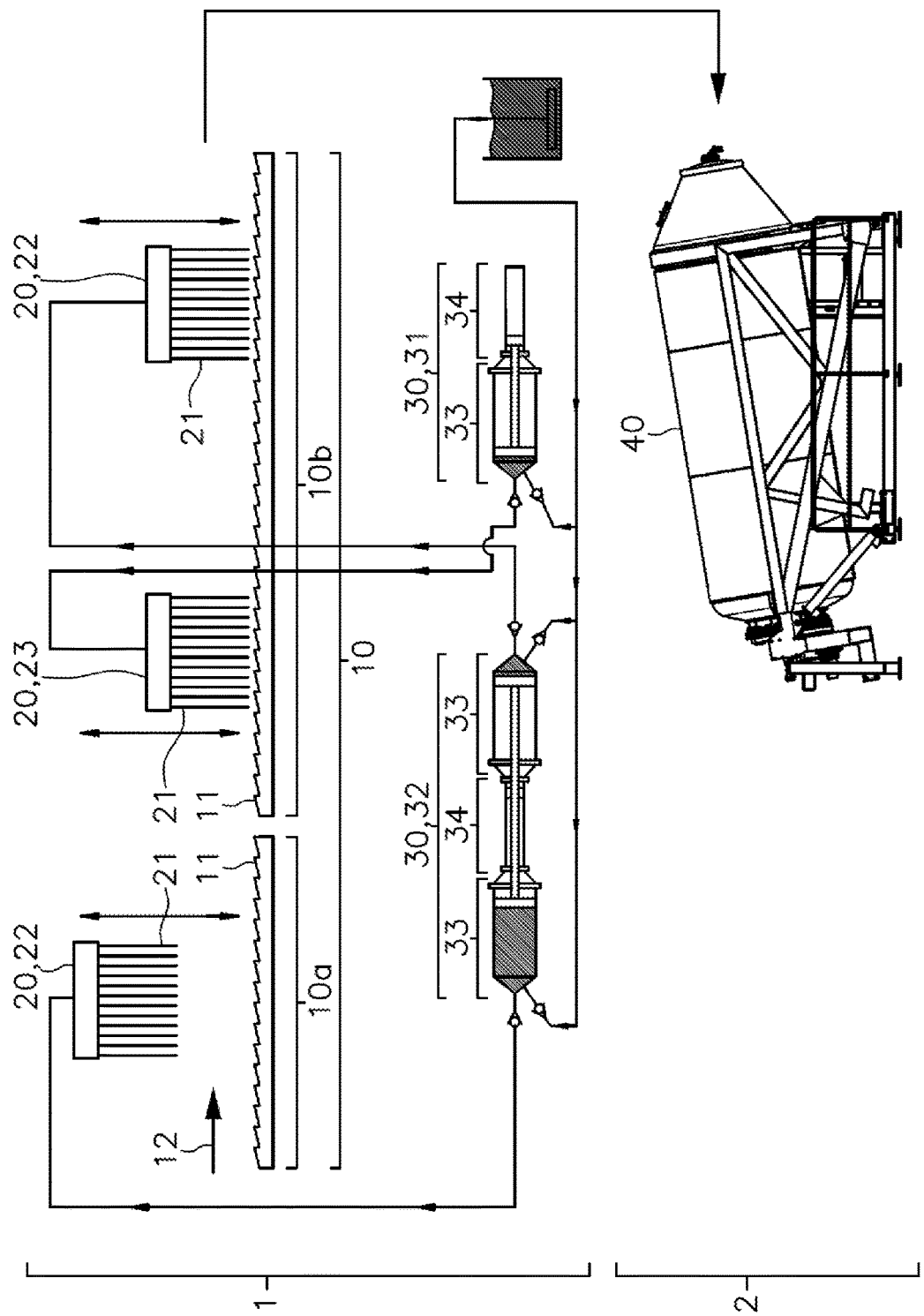

PLANT AND METHOD FOR THE TREATMENT OF WHOLE MUSCLE MEAT

FIELD OF THE ART

The present invention relates to the field of plants and methods for the treatment of whole muscle meat, particularly to methods for curing meat by means of brine injection and massaging for the subsequent curing or cooking thereof, for obtaining cold cuts or meat products.

STATE OF THE ART

Plants for the treatment of whole muscle meat by means of brine injection and subsequent massaging by turning said whole muscle meat using an injection apparatus and a massaging application apparatus are known in the current state of the art.

Patent documents EP0575024, EP1269853 and EP1402782 describe plants of this type, in which an injection apparatus provided with two injector heads successively injects brine on the same parts of whole muscle meat, causing said whole muscle meat to absorb part of the injected brine, with the corresponding increase in weight. Said injected whole muscle meat is subsequently introduced in a rotary drum of a massage application apparatus where, by means of the rotation of the rotary drum, the whole muscle meat is turned, bringing about the tenderization thereof and additional brine absorption and a resulting increase in weight.

However, limited absorption is achieved with the method described in these documents because the use of two injector heads only allows achieving an increase in weight of the whole muscle meat by brine absorption of between 70% and 105%, depending on the type of injector needles and on the injection pressure.

Said described documents make no reference to the distance existing between the injector heads or to the time lapsing between successive injections occurring on one and the same piece of whole muscle meat. However, the time lapsing between successive injections considerably affects absorption of the injected brine by the whole muscle meat, because if the injections are too close to one another over time, the new injected brine displaces the previously injected brine that has infiltrated the muscles and not yet been absorbed, whereas if the injections are too spaced out over time the intermuscular spaces through which the brine is filtered under pressure close, hindering the correct infiltration and subsequent absorption of the following brine injections.

The subsequent massaging occurring in the proposed massage application apparatus do not achieve optimal absorption either because limited rotary drum diameters and low rotation speeds mean that the whole muscle meat contained in said drum does not fall from a considerable height, and therefore it is not subjected to intense massaging either, which brings about the need for longer massaging times, producing lower absorptions and meat that does not look like whole muscle and which has a large amount of intermuscular paste, which is a product of the emulsion of the meat and brine secretions, which is rather unappealing.

The already injected whole muscle meat is also known to be re-fed into the injection apparatus before it is massaged, therefore achieving a dual injection of the whole muscle meat. However, since four injections occur on one and the same piece of whole muscle meat, it ends up losing its absorption capacity because the pressurized brine flows through the holes from previous injections, getting out of the whole muscle meat without being absorbed. Furthermore, it has also been found that the idling occurring between the first pass and the second pass through the injection apparatus reduces the brine absorption capacity in the second pass, bringing about more draining and a lower weight gain.

An injection apparatus provided with three injector heads is also known by means of patent document U.S. Pat. No. 7,094,435. However, said patent document proposes that one of the heads injects carbon monoxide into the whole muscle meat, the objective sought therefore being one other than optimizing brine absorption by the whole muscle meat.

Massage application apparatus typically have a rotary drum with a maximum inner diameter less than 140 cm and use rotation speeds less than 12 revolutions per minute, because due to the considerable weight of the whole muscle meat, higher speeds and larger diameters will cause more vibrations and instability in the rotary drum.

A large-sized rotary drum provided with means which allow partially eliminating or absorbing vibrations is known by means of patent document EP2796046, for example.

BRIEF DESCRIPTION OF THE INVENTION

According to a first aspect, the present invention relates to a plant for the treatment of whole muscle meat including a brine injection apparatus comprising, according to an arrangement known in the sector:

a conveyor device for conveying a whole muscle meat defining a conveying direction, and a conveying surface on which said whole muscle meat is to be placed;

a plurality of successive injector heads, in the conveying direction, each provided with a plurality of injector needles parallel to one another and orthogonal to said conveying surface, wherein each injector head is movable in a direction orthogonal to the conveying surface between an injection position and a standby position away from the conveying surface, and wherein each of said needles is hollow and is connected to a pressurized brine supply device;

and wherein said plant also integrates at least one massage application apparatus including a rotary drum suitable for being loaded with the whole muscle meat after it has gone through the injection apparatus.

The proposed plant therefore includes as an essential component said brine injection apparatus, which conveys by means of a conveyor device the supplied whole muscle meat to place it opposite a plurality of injector heads provided with injector needles.

The conveyor device can be of any known type, such as conveyor belts, pushers, trays that can be conveyed over trunnions, or preferably by means of a reciprocating feed dog.

The moveable elements, such as the conveyor device or the injector heads, will be operated by means of operating devices such as, for example, rotary or linear motors, servomotors, pneumatic or hydraulic pistons, etc.

According to the proposed invention, said injector heads are moved, inserting said injector needles in the whole muscle meat, and they allow injecting therethrough pressurized brine into the whole muscle meat, part of which is absorbed by the raw meat integrating all the compounds dissolved in said brine in the whole muscle meat. At the same time, the weight of said whole muscle meat is also increased as said brine is absorbed, which allows obtaining higher yields and therefore lower prices for said meat.

After the whole muscle meat goes through the injection apparatus, it is led to a massage application apparatus and introduced in its rotary drum through an inlet port. Said rotary drum will typically have a cylindrical section, the central axis of which will coincide with the axis of rotation of the drum, with one closed end and with a frustoconical opposite end in the center of which the inlet port will be located.

The axis of rotation of the rotary drum will be horizontal or will have an inclination less than 20°, the center of the closed end being lower than the inlet port.

The rotation of the rotary drum will cause the whole muscle meat contained therein being to be driven upwards on the inner face of the rotary drum on which said meat will be placed until gravity makes said whole muscle meat fall once again to the lower part of the rotary drum, the meat hitting against it and being massaged. The repetition of this process tenderizes the meat and allows additional brine penetration and absorption therein.

In order for this process to take place, the rotation speed of the rotary drum combined with its diameter must produce a centrifugal force on said inner face that is less than the force of gravity, because otherwise the whole muscle meat would remain pressed against the inner face of the cylindrical drum the entire time, without ever falling due to the effect of gravity.

However, in a novel manner the present invention proposes the following:
  there are three injector heads (20);
  one injector head (20), constituting a stand-alone injector head (23), is connected to a first pressurized brine supply device (31), being independent from the remaining injector heads (20);
  said rotary drum (40) has an inner face with a maximum inner diameter comprised between 140 cm and 210 cm and is operated by means of a motor making it rotate at between 14 and 20 revolutions per minute;
such that the brine injection occurring in the injection apparatus and the turning occurring in the massage application apparatus allow increasing the weight of the whole muscle meat, with respect to the initial weight before it goes through the plant, by up to more than 220% by means of brine absorption.

Including three injector heads in one and the same injection apparatus allows successive triple injection, thereby achieving greater and better brine absorption. Performing three consecutive injections obtains better results than performing three non-consecutive injections, with longer standby periods between them, because for a brief time period after injecting the brine and after absorbing most of said brine, the whole muscle meat has a higher brine absorption capacity because the intermuscular spaces are open due to the effect of the preceding injection. However, after that time period said spaces close, and the following injection is less effective. Therefore, by only having two injector heads this effect can only be taken advantage of with the second injector head; in contrast, by having three injector heads this effect is taken advantage of with the second and third injections, therefore being much more effective. This process is known as exponential injection.

In addition, performing four injections can be counterproductive because inserting too many injector needles into the meat opens up paths that make it easy for the injected pressurized brine to get out without being absorbed.

It is also proposed that one of the injector heads is fed from a first pressurized brine supply device that is independent from the remaining injector heads, which allows independently regulating the brine injection speed, flow rate, pressure and volume of at least one of the injector heads independently from the rest. This allows optimizing the mentioned intermuscular space expansion effect, adjusting the parameters to adapt it to different types of whole muscle meat and their specificities.

It has additionally been envisaged that after brine injection by means of the three injector heads the whole muscle meat is introduced inside a rotary drum with a maximum inner diameter comprised between 140 and 210 cm, and which will rotate at a speed of between 12 and 20 revolutions.

A rotary drum having a large diameter such as the one proposed allows the pieces of whole muscle meat to have a greater fall height inside the massage application apparatus, which contributes to obtaining a more tender meat in less time, improving brine absorption parameters during said massage, and it yields a meat that looks more like whole muscle and has a smaller amount of intermuscular paste, which is a result of the emulsion of the meat and brine secretions.

Rotation speeds of the rotary drum are greater than conventional rotation speeds in the sector, and combined with the larger diameter of the rotary drum, they produce higher tangential speeds. As a result, the treated whole muscle meat is moved at much higher speeds than usual, and therefore the impacts received while turning inside the rotary drum and falling to its lower part are also greater. The use of speeds lower than those proposed would not confer as much kinetic energy to the meat, nor would it cause it to rise to a considerable height inside the rotary drum. In contrast, the use of higher speeds could cause the centrifugal force to be greater than the force of gravity, and therefore the meat would be prevented from falling, the massage thereof therefore being impeded.

The effect of the massage application apparatus can obviously be improved by means of incorporating paddles or ribs on the inner face of its rotary drum.

An increase in the amount of brine absorbed by the whole muscle meat with respect to the known state of the art is thereby achieved, achieving better yields. The proposed plant can achieve an increase in the mass of the whole muscle meat equal to or greater than 220%, which is known as a very high-yield product.

According to a proposed additional embodiment, said stand-alone injector head is sandwiched, in the conveying direction, between the remaining two injector heads.

Said injector heads other than the stand-alone injector head are additionally contemplated as constituting two linked injector heads which are connected to an at least partially shared second pressurized brine supply device, and wherein said two linked injector heads reach the injection position at alternating times. By reaching the injection position at alternating times, one and the same pressurized brine supply device can feed both injector heads also at alternating times, thereby preventing the need to feed both heads at the same time, and allowing a simplification and cost reduction for the plant since one of the pressurized brine supply devices is at least partially shared.

It will be understood that the pressurized brine supply devices can be pumps of any type, being either those of the type operating continuously or preferably being pumps provided with a plunger that is operated along the length of a metering chamber that is filled with a brine injection dose for subsequently driving said brine dose under pressure through conduits towards all the injector needles of one and the same injector head.

It will also be understood that "partially shared" means that at least part of the components constituting said second pressurized brine supply device are used to provide pressurized brine to both linked injector heads. In this case, the invention proposes that one and the same operating piston provided with plungers at its two ends, each connected to a different metering chamber, causes at the same time it moves one of said metering chambers, i.e., the one intended for feeding one of the linked injector heads, to fill, while at the same time the other metering chamber connected to the other one of the linked injector heads is emptied under pressure.

According to another additional embodiment, the conveyor device has at least two segments that can be independently operated, the conveying surface of each of said segments facing one of said two linked injector heads. This feature allows, while one of the linked injector heads is in the injection position, and therefore the whole muscle meat placed on the conveying surface below said injector head must be stopped, other pieces of whole muscle meat to be conveyed by means of the operation of another segment of the conveyor device, the other one of the linked injector heads being in the standby position.

Preferably one of said segments of the conveyor device will be facing one of the linked injector heads and the stand-alone injector head at the same time, said two injector heads being coordinated for reaching the injection position at the same time.

The brine injection apparatus is also contemplated as having a cleaning position in which all the injector heads are positioned at the same time in the standby position, away from the conveying surface. This feature is important, taking into account that for public health reasons, the injection apparatus must be frequently cleaned and disinfected, and being able to locate all its injector heads in the standby position at the same time, even if they are not in the standby position at the same time during operation, makes said operations easier and simpler as it offers better access to the conveyor device.

According to an additional embodiment, the operation of the stand-alone injector head can be deactivated, the latter being kept in the standby position during the operation of the rest of the injection apparatus, therefore becoming an injection apparatus provided with two injector heads. This can be useful for the treatment of certain types of meat, or in the case of requiring fewer brine applications.

Preferably the injector needles are proposed to cause brine injection at a constant pressure since they remain inserted in the whole muscle meat by means of spraying the brine through multiple spaced holes arranged along the longitudinal body of each injector needle. This embodiment achieves much greater and more uniform brine penetration in the whole muscle meat and in the intermuscular spaces, and therefore provides greater absorption. It furthermore allows locating fewer injector needles that are more spaced from one another, which produces fewer holes in the whole muscle meat through which the brine injected under pressure can be filtered or drained, therefore achieving better absorption.

As an additional option, each of the individual needles is also contemplated to integrate an individual retraction mechanism which allows, in the event that said injector needle run into an obstacle, such as a bone included in the whole muscle meat, for example, the needle can be retracted with respect to the rest of the injector needles in the same injector head. This allows the injector head to continue moving towards the maximum injection position without damaging those injector needles running into a bone of the whole muscle meat. This feature is only optional and may not be present in the preferred embodiment.

It is also preferable for the distance between successive injector heads, in the conveying direction, to be equal to or greater than or more than twice the distance, in the conveying direction, of the area covered with the injector needles of each of said injector heads. Since the injector needles must be inserted in all the parts of the whole muscle meat, said distance existing between the injector heads means that the time between one injection and the next will be equal to, greater than or more than twice the time required to perform one of said injections, because after each of the injections the conveyor device will move the whole muscle meat a distance equal to the distance in which the whole muscle meat has already been injected by means of the injector needles of an injector head, in the conveying direction. If the distance between injector heads is, for example, twice the length of the injector head covered with injector needles in the conveying direction, the meat, being conveyed from one injector head to the next, will be in standby at least twice as long as it is actually being injected. Obviously additional regulations can increase the standby time momentarily stopping the operation of the injector heads, but this would reduce the productivity of the injection apparatus.

In the case described above of deactivating the stand-alone injector head, this injector head being sandwiched between the remaining injector heads, the distance between said remaining active injector heads is greatly increased, and therefore the standby time between two consecutive injections is also increased without being too much so as to lose the effect described above of improving absorption of the meat after a first injection. This property allows one and the same plant to be configured to work like a plant for the preparation of extremely high-yield products with exponential injection, or simply as a plant for the preparation of high-yield products without exponential injection.

According to a second aspect of the present invention, a method for the treatment of whole muscle meat implemented in a plant for the treatment of whole muscle meat such as the one described above is also proposed, in which the inclusion of the following steps is proposed in a novel manner:

loading pieces of whole muscle meat on an inlet end of said conveying surface;

conveying, in the conveying direction, the whole muscle meat by means of the operation of the conveying device locating and stopping all the parts of said whole muscle meat successively in three stop positions, each located below one of the three injector heads constituting the plurality of injector heads;

operating each injector head facing each stop position from the standby position to the injection position in coordination with the conveyor device, causing the insertion of its corresponding injector needles into a whole muscle meat located and stopped below said injector head;

operating the pressurized brine supply device connected to the injector needles of each injector head in coordination with the operation of said injector heads, causing the injection of the brine into the whole muscle meat;

operating each of the injector heads from the injection position to the standby position in coordination with the conveyor device, causing the removal of its corresponding injector needles from the whole muscle meat.

introducing, after the last injection, the whole muscle meat in a massage application apparatus provided with a rotary drum with a maximum inner diameter of between 140 and 210 cm together with brine;

turning the rotary drum at a speed of between 14 and 20 revolutions per minute, causing each piece of whole muscle meat to fall successively, causing the massage thereof and additional brine absorption;

such that the brine injection occurring in the injection apparatus and the turning occurring in the massage application apparatus allow increasing the weight of the whole muscle meat, with respect to the initial weight before it goes through the plant, by up to more than 220%.

The proposed method allows performing said exponential injection in an optimal manner, obtaining much higher brine absorption values than usual in the sector, while at the same time obtaining a final whole muscle meat product with a better appearance and better physicochemical qualities.

Additionally, and optionally, the time lapsing between two brine injections occurring in one and the same portion of whole muscle meat in two successive injector heads is comprised between 10 seconds and 120 seconds. This is considered to be the time period during which the effect described above which allows the so-called exponential injection is produced for the most part.

By means of said method, it is considered that the amount of brine injected in the whole muscle meat as it goes through the brine injection apparatus can increase the weight of the whole muscle meat by more than 110% or by more than 120%.

Furthermore, each piece meat is also proposed to be turned inside the massage application apparatus for a time equal to or less than 180 minutes, or equal to or less than 150 minutes, even being able to achieve a satisfactory result with treatment times of less than 120 minutes. As a result of the mentioned features of the diameter and the rotation speed of the rotary drum, times of less than 180 minutes allow obtaining the properties sought in the treated whole muscle meat, these times being less than those usually required in industry.

Preferably the turning of the rotary drum of the massage application apparatus causes each piece of whole muscle meat to fall successively from a height greater than 60% of the maximum inner diameter of the rotary drum, which assures a vigorous massage.

The operation of two of the linked injector heads is optionally contemplated to be coordinated to cause their respective insertion at alternating times, and said linked injector heads are optionally contemplated to be connected to a second pressurized brine supply device at least partially shared between said linked injector heads supplying brine to them at alternating times.

The conveying device can additionally consist of at least two segments that can be independently operated, the conveying surface of each of said segments facing one of said two linked injector heads, and at least part of the operation of each of the segments occurring in alternating periods. Therefore while one a linked injector head is treating whole muscle meat on the conveying surface of a first segment of the conveyor device, the second segment can operate conveying whole muscle meat in order to locate it facing the other linked injector head, which will be in the standby position at that time, and vice versa.

It will be understood that one and the same injection apparatus can feed a plurality of massage application apparatus, optimizing plant operation.

It will be understood that references of geometric position, such as, for example parallel, perpendicular, tangent, etc., allow deviations of up ±5° with respect to the theoretical position defined by said nomenclature.

It will also be understood that any range of values provided may not be optimal at the extreme values and adaptations of the invention may be required so that said extreme values are applicable, said adaptations being within reach of the person skilled in the art.

Other features of the invention can be found in the following detailed description of an embodiment.

BRIEF DESCRIPTION OF THE DRAWINGS

The foregoing and other advantages and features will be better understood from the following detailed description of an embodiment in reference to the attached drawings which must be interpreted in an illustrative and non-limiting manner, in which:

FIG. 1 shows a diagram of the proposed plant made up of an injection apparatus provided with three injector heads, two of which are linked and one of which is a stand-alone injector head, and a conveyor device made up of two segments and a massage application apparatus.

DETAILED DESCRIPTION OF AN EMBODIMENT

According to an illustrative and non-limiting embodiment shown in FIG. 1, the proposed plant for the treatment of whole muscle meat includes a brine injection apparatus 1 and a massage application apparatus 2.

The injection apparatus 1 includes a conveyor device 10 formed by a conveying surface 11 provided with parallel grooves arranged in the conveying direction 12 in which there are located a plurality of notched bars provided for being operated by means of a motor bringing about the upward movement thereof, projecting from the conveying surface 11, and forward movement in the conveying direction 12, followed by a downward movement, remaining below the conveying surface 11, and a return movement to return to the initial position. This repetitive back and forth movement brings about the step-wise movement of the whole muscle meat along the conveying surface 11 in the conveying direction 12. Of course other embodiments with conveyor devices other than the one described, such as conveyor belts, pushed or driven trays, etc., are also contemplated.

In this embodiment, said conveyor device 10 is made up of independently operating first and second segments 10a and 10b. The first segment 10a has a conveying surface 11 facing a first injector head 20 provided with a plurality of injector needles 21 parallel to one another and perpendicular to said conveying surface 11. The second segment 10b has its corresponding conveying surface 11 first facing a second injector head 20 and then a third injector head 20, both likewise provided with parallel injector needles 21.

Each injector head 20 is operated by means of motors in a direction parallel to the injector needles 21, between a maximum injection position, in which the injector needles 21 reach the conveying surface 11, going through the entire piece of whole muscle meat placed above same, and a maximum standby position spaced from said conveying surface 11, in which the injector needles 21 do not interact with the whole muscle meat placed on said conveying surface 11. Each individual needle is hollow and has a plurality of holes arranged at regular intervals on its sides, being connected, through the injector head 20, to a pressurized brine supply device.

Foreseeing that an injector needle 21 will run into a solid body such as a bone before reaching the conveying surface 11, all the injector needles 21 are contemplated to be provided with an individual retraction mechanism allowing their retraction movement with respect to the rest of the injector needles 21 against a predefined external stress. However, the inclusion of said individual retraction mechanism is not considered indispensable in the present embodiment.

According to this embodiment, the second injector head 20, interposed between the first and third injector heads 20, constitutes a stand-alone injector head 23 which is connected by means of a conduit to a first pressurized brine supply device 31, which pumps pressurized brine from a tank to all the injector needles 21 of said stand-alone injector head 23. In the present embodiment, said first pressurized brine supply device 31 consists of an operating piston 34 which moves a plunger along the length of a metering chamber 33 such that when the plunger moves in one direction, the metering chamber 33 is filled with a predefined amount of brine absorbed from a tank, and when the plunger moves in the opposite direction, it is emptied under pressure. A valve system is responsible for directing the brine flow towards the injector needles 21, preventing it from returning to the tank.

The first and third injector heads 20 are in turn connected by means of conduits to a second pressurized brine supply device 32 other than and independent of the first pressurized brine supply device 31, constituting two linked injector heads 22. Said second pressurized brine supply device 32 consists of two metering chambers 33, each with its respective plunger and each connected by means of conduits to one of the two linked injector heads 22, but both plungers being connected to one and the same operating piston 34, such that the movement of the mentioned operating piston 34 causes one of the metering chambers 33 to fill and the other metering chamber 33 to empty at the same time.

This shared second pressurized brine supply device 32 requires each of the two linked injector heads 22 to be positioned in the injection position at alternating times, their movement being coordinated with the movement of the conveying device 10 and with the operation of the second pressurized brine supply device 32.

In the embodiment shown, the distance separating two contiguous injector heads 20 in the conveying direction 12 is about twice the length of said injector heads 20 in the conveying direction 12, considering only the area covered with injector needles 21. This allows the time lapsing between one injection and the next, the standby time, to be at least twice the time an injection lasts. Preferably said standby time is between 10 seconds and 120 seconds.

After going through the injection apparatus 1, the already injected whole muscle meat is introduced in the massage application apparatus 2, including a rotary drum 40 formed by an oblong-shaped hollow cylindrical body with a closed end lower than the other end which is finished in the form of a cone frustum, in the center of which there is located the inlet port through which the whole muscle meat is introduced therein.

Said rotary drum has a maximum inner diameter of between 140 cm and 210 cm and is connected to a motor causing its rotation at a speed comprised between 14 and 20 revolutions per minute.

Paddles or ribs can optionally be included on the inner face of the rotary drum to improve the effect of turning and massaging.

The whole muscle meat will be treated for a time of less than 180 minutes, the treatment time preferably being less than 150 minutes, obtaining as a final result a whole muscle meat with excellent qualities and appearance and with a weight up to more than 220% greater than the initial weight before treatment in the proposed plant.

It will be understood that the different parts constituting the invention described in one embodiment can be freely combined with the parts described in other different embodiments, even though said combination has not been explicitly described, provided that there is not any sort of drawback resulting from the combination.

The invention claimed is:

1. A plant for the treatment of whole muscle meat including a brine injection apparatus integrating
    a conveyor device of whole muscle meat defining a conveying direction, and a conveying surface on which said whole muscle meat is to be placed;
    three injector heads successive in the conveying direction, each provided with a plurality of injector needles parallel to one another and orthogonal to said conveying surface, wherein each injector head is movable in a direction orthogonal to the conveying surface between an injection position and a standby position away from the conveying surface, and wherein each of said injector needles is hollow and is connected to a pressurized brine supply device; and
    wherein said plant also integrates at least one massage application apparatus including a rotary drum suitable for being loaded with the whole muscle meat after it has gone through the injection apparatus; wherein
    there are three injector heads;
    one injector head, constituting a stand-alone injector head, is connected to a first pressurized brine supply device, being independent from the remaining injector heads which constitute two linked injector heads which reach the injection position at alternating times;
    the conveyor device has at least two segments that can be independently operated, the conveying surface of each of said segments facing one of said two linked injector heads; and in that
    said rotary drum has an inner face with a maximum inner diameter comprised between 140 cm and 210 cm and is operated by a motor making the drum rotate at between 14 and 20 revolutions per minute;
    such that the brine injection occurring in the injection apparatus and the turning occurring in the massage application apparatus allow increasing the weight of the whole muscle meat, with respect to the initial weight before the meat goes through the plant, by up to more than 220% by way of brine absorption.

2. The plant according to claim 1, wherein said stand-alone injector head is sandwiched, in the conveying direction, between the remaining two injector heads.

3. The plant according to claim 1, wherein said two linked injector heads are connected to an at least partially shared second pressurized brine supply device.

4. The plant according to claim 1, wherein the brine injection apparatus has a cleaning position in which all the injector heads are positioned at the same time in the standby position, away from the conveying surface.

5. The plant according to claim 1, wherein the operation of the stand-alone injector head can be deactivated, the latter being kept in the standby position during the operation of the rest of the injection apparatus.

6. The plant according to claim 1, wherein the injector needles comprise multiple spaced holes arranged along the longitudinal body of each injector needle and produce a constant pressurized brine injection in the whole muscle meat by spraying the brine through the mentioned holes.

7. The plant according to any claim 1, wherein the distance between successive injector heads, in the conveying direction, is equal to or greater than or more than twice the distance, in the conveying direction, of the area covered with the injector needles of each of said injector heads.

8. A method for the treatment of whole muscle meat implemented in a plant for the treatment of whole muscle meat including a brine injection apparatus integrating:
  a conveyor device for conveying a whole muscle meat defining a conveying direction, and a conveying surface on which said whole muscle meat is to be placed;
  three successive injector heads, in the conveying direction, each provided with a plurality of injector needles parallel to one another and orthogonal to said conveying surface, wherein each injector head is movable in a direction orthogonal to the conveying surface between an injection position and a standby position, and wherein each of said needles is hollow and is connected to a pressurized brine supply device;
and wherein said plant also integrates at least one massage application apparatus including a rotary drum suitable for being loaded with the whole muscle meat after it has gone through the injection apparatus;
wherein said method includes the following steps:
  loading pieces of whole muscle meat on an inlet end of said conveying surface;
  conveying, in the conveying direction, the whole muscle meat by means of the independent operation of at least two segments of the conveying device, the conveying surface of each of said segments facing one of said two linked injector heads, locating and stopping all the parts of said whole muscle meat successively in three stop positions, each located below one of the three injector heads constituting the plurality of injector heads, at least part of the operation of each of the segments occurring in alternating periods;
  operating each injector head facing each stop position from the standby position to the injection position in coordination with the conveyor device, causing the insertion of its corresponding injector needles into a whole muscle meat located and stopped below said injector head;
  operating the pressurized brine supply device connected to the injector needles of each injector head in coordination with the operation of said injector heads, causing the injection of the brine into the whole muscle meat;
  operating each of the injector heads from the injection position to the standby position in coordination with the conveyor device, causing the removal of its corresponding injector needles from the whole muscle meat;
  coordinate the operation of two injector heads to cause the insertion of their respective injector needles into the whole muscle meat at alternating times, said two injector heads constituting linked heads,
  supplying brine to said linked heads at alternating times;
  independently operate at least two segments of the conveying device positioning the conveying surface of each of segment facing one of said two linked injector and at least part of the operation of each of the segments occurring in alternating periods;
  introducing, after the last injection, the whole muscle meat in a massage application apparatus provided with a rotary drum with a maximum inner diameter of between 140 and 210 cm together with brine;
  turning the rotary drum at a speed of between 14 and 20 revolutions per minute, causing each piece of whole muscle meat to fall successively, causing the massage thereof and additional brine absorption;
such that the brine injection occurring in the injection apparatus and the turning occurring in the massage application apparatus allow increasing the weight of the whole muscle meat, with respect to the initial weight before it goes through the plant, by up to more than 220%.

9. The method according to claim 8, wherein the time lapsing between two brine injections occurring in one and the same portion of whole muscle meat in two successive injector heads is between 10 seconds and 120 seconds.

10. The method according to claim 8, wherein the amount of brine injected in the whole muscle meat as it goes through the brine injection apparatus increases the weight of the whole muscle meat by more than 110% or by more than 120%.

11. The method according to claim 8, wherein each piece of meat is turned inside the massage application apparatus for a time equal to or less than 180 minutes, or equal to or less than 150 minutes, or equal to or less than 120 minutes.

12. The method according to claim 8, wherein a second pressurized brine supply device is at least partially shared between said linked injector heads, supplying brine to them at alternating times.

13. The method according to claim 8, wherein the brine injection in the whole muscle meat occurs at a constant pressure by means of spraying the brine through multiple spaced holes arranged along the length of each injector needle.

14. A brine injection apparatus for a plant for treatment of whole muscle meat integrating a conveyor device of whole muscle meat defining a conveying direction, and a conveying surface on which said whole muscle meat is to be placed;
  three injector heads successive in the conveying direction, each provided with a plurality of injector needles parallel to one another and orthogonal to said conveying surface, wherein each injector head is movable in a direction orthogonal to the conveying surface between an injection position and a standby position away from the conveying surface, and wherein each of said injector needles is hollow and is connected to a pressurized brine supply device; and
  one injector head, constituting a stand-alone injector head, is connected to a first pressurized brine supply device, being independent from the remaining injector heads which constitute two linked injector heads which reach the injection position at alternating times;
  the conveyor device has at least two segments that can be independently operated, the conveying surface of each of said segments facing one of said two linked injector heads.

* * * * *